United States Patent
Beck

(10) Patent No.: US 7,025,699 B2
(45) Date of Patent: Apr. 11, 2006

(54) ELASTOMER COMPOSITION FOR POWER TRANSMISSION BELT TOOTH FACING

(75) Inventor: Harold D. Beck, Strafford, MO (US)

(73) Assignee: Dayco Products, LLC, Miamisburg, OH (US)

( * ) Notice: Subject to any disclaimer, the term of this patent is extended or adjusted under 35 U.S.C. 154(b) by 188 days.

(21) Appl. No.: 10/421,267

(22) Filed: Apr. 23, 2003

(65) Prior Publication Data
US 2004/0214675 A1    Oct. 28, 2004

(51) Int. Cl.
| F16G 1/06 | (2006.01) |
| F16G 5/04 | (2006.01) |
| B29D 29/08 | (2006.01) |

(52) U.S. Cl. ............... 474/260; 474/205; 474/264; 474/268; 156/138; 156/137; 526/282

(58) Field of Classification Search ........... 474/205, 474/237, 260–263, 268, 264; 525/191, 148, 525/133; 526/250, 339, 348.8, 282; 521/51, 521/161, 176; 428/364; 264/291, 210.8
See application file for complete search history.

(56) References Cited

U.S. PATENT DOCUMENTS

| 3,580,767 | A |   | 5/1971 | Barnes et al. |
| 3,890,263 | A | * | 6/1975 | Meynard ............ 524/68 |
| 3,894,900 | A |   | 7/1975 | Redmond, Jr. |
| 3,964,328 | A | * | 6/1976 | Redmond, Jr. ........ 474/205 |
| 4,034,615 | A |   | 7/1977 | Brooks |
| 4,066,732 | A |   | 1/1978 | Redmond, Jr. |
| 4,108,012 | A |   | 8/1978 | Warner et al. |
| 4,251,306 | A |   | 2/1981 | Breher |
| 4,787,961 | A |   | 11/1988 | Rush |
| 4,838,843 | A |   | 6/1989 | Westhoff |
| 4,952,261 | A |   | 8/1990 | Nosaka et al. |
| 5,066,344 | A |   | 11/1991 | Inami et al. |
| 5,098,346 | A |   | 3/1992 | Redmond |
| 5,118,773 | A | * | 6/1992 | Takao et al. ......... 526/282 |
| 5,267,908 | A |   | 12/1993 | White, Jr. et al. |

(Continued)

FOREIGN PATENT DOCUMENTS

DE    3234174 A1 *    3/1984

(Continued)

OTHER PUBLICATIONS

Ernest R. Kaswell, *Wellington Sears Handbook of Industrial Textiles*, 1963, pps. 224-231, Published by: Wellington Sears Company, Inc., New York, NY U.S.A.

*Primary Examiner*—Marcus Charles
(74) *Attorney, Agent, or Firm*—Joseph V. Tassone; J. Daniel Lykins

(57) ABSTRACT

An endless positive drive power transmission belt is described for use with a cooperating pulley member, wherein the endless positive drive transmission belt comprises an elastomeric body portion, a plurality of longitudinally extending spaced apart tensile members, and a layer of wear-resistant fabric material positioned on the cooperating pulley member engaging surface of said belt, wherein a layer of a high ethylene-containing elastomer composition is bonded to a surface of the layer of wear-resistant fabric material in such a manner that the surface layer of the high ethylene-containing elastomer is disposed between the layer of wear-resistant fabric material and the cooperating pulley member. A method for coating a wear-resistant fabric material with a high ethylene-containing elastomer is also described.

21 Claims, 1 Drawing Sheet

U.S. PATENT DOCUMENTS

| | | |
|---|---|---|
| 5,268,221 A | 12/1993 | Nakanishi et al. |
| 5,458,710 A | 10/1995 | White, Jr. et al. |
| 5,536,214 A | 7/1996 | Akita et al. |
| 5,545,097 A | 8/1996 | Kitazurai et al. |
| 5,609,541 A | 3/1997 | Tachibana et al. |
| 5,807,194 A | 9/1998 | Knutson et al. |
| 5,971,879 A | 10/1999 | Westhoff |
| 6,031,010 A * | 2/2000 | Lin ............................ 521/51 |
| 6,296,588 B1 * | 10/2001 | Ciemniecki et al. ........ 474/268 |
| 6,352,488 B1 * | 3/2002 | Morris et al. ............... 474/263 |
| 6,419,775 B1 | 7/2002 | Gibson et al. |
| 6,443,866 B1 | 9/2002 | Billups |
| 6,476,172 B1 * | 11/2002 | Wachowicz et al. ..... 526/348.1 |
| 6,503,164 B1 | 1/2003 | Ito |
| 6,511,394 B1 * | 1/2003 | Okuno et al. ............... 474/260 |

FOREIGN PATENT DOCUMENTS

| | | | |
|---|---|---|---|
| EP | 0106027 A1 * | 7/1983 | ................ 525/133 |
| JP | 11-131351 A * | 5/1999 | |

* cited by examiner

ELASTOMER COMPOSITION FOR POWER TRANSMISSION BELT TOOTH FACING

BACKGROUND OF THE INVENTION

The present invention relates to endless belts, particularly to an endless belt having power transmission surfaces exhibiting high wear resistance, and more particularly to a timing belt jacket fabric coated with a material which exhibits improved wear resistance and lubricity, as well as to a method for producing such belts.

It is known to provide an endless power transmission belt construction having an inner longitudinal surface, an outer longitudinal surface and opposed side edges, wherein the outer surface of the belt is a substantially flat surface and the inner surface of the belt is defined by a plurality of longitudinally disposed and alternately spaced apart projections and grooves. Such endless belts such as toothed belts are commonly used in high temperature, high speed and high load environments associated with various industrial and automotive drive systems. In the automotive area, various factors have contributed to the growing demand for such belts that perform under increasingly high loads and temperatures which ordinarily reach 120° C. to 140° C. under high load and high speed. It is common for the surfaces of the spaced apart projections and grooves to deteriorate when exposed to such conditions over time.

In recent years, performance characteristics of endless belts, such as minimal frictional heat generation, quiet operation, dimensional stability and high temperature performance, have become increasingly important in automotive original equipment and aftermarket applications. With respect to endless toothed belts in particular, frictional heat generation and heat build-up reduce the efficiency of the belt, and the higher operating temperatures frequently encountered by the belts can reduce belt life considerably by lowering the tear strength and fatigue life of the tooth or by weakening the bonds between the belt components. The use of a wear resistant fabric positioned along the outer sprocket-engaging face of the belt has been used to reduce the excessive wear problem. The improvement realized, however, has not proved to be completely satisfactory. Other attempts to improve the wear resistance of the belts have included the use of an elastomer impervious material, such as polyethylene bonded to one side of the wear-resistant fabric surface so that during the casting operating the elastomer impervious material seals the outer side only of the fabric and thereby isolates the elastomer from the outer surface of the fabric layer by preventing the fibers on the outermost surface layer from becoming completely encapsulated by elastomer. While polyethylene has been used with moderate success for many years in reducing excess wear on the belt tooth surface, the demands placed on such belts by the present automotive environment requires that belts with even more stringent wear resistant characteristics be developed to meet the need of the industry.

Consequently, there remains an urgent need in the automotive industry to produce an endless belt, including an endless toothed belt which overcomes the inadequacies of prior constructions, does not experience significant frictional heat generation and which otherwise remains dimensionally stable throughout its life.

SUMMARY OF THE INVENTION

It is a primary object of the present invention to provide an endless belt construction which exhibits improved wear resistance and lubricity, reduced heat generation and increased dimensional stability compared to known belt construction.

It is another object of the invention to provide a method for manufacturing an endless belt construction which exhibits improved wear resistance, reduced heat generation and increased dimensional stability compared to known belt constructions.

In accordance with the invention, a high ethylene-containing elastomer or plastomer is coated onto a porous wear resistant material such as a woven or non-woven fabric wherein the coated wear resistant material is employed as a wear resistant driving surface or wear resistant backing surface which provides superior wear properties and lubricity as well as reduced heat generation characteristics and improved dimensional stability to an endless belt when compared to the wear resistant fabric material used either alone or coated with other conventional coatings.

According to the invention, a unique belt construction comprising an endless belt having a substantially flat outer surface extending longitudinally along the outer surface of the belt; a driving surface defined by a porous, wear resistant fabric material defining the inner surface of the endless belt; and a pair of opposing side surfaces which define opposing sides of the endless belt, wherein a specialized high ethylene-containing elastomer or plastomer is coaled onto the wear resistant material is described. By taking advantage of current state of the art of high ethylene-containing elastomer chemistry and appropriate coating methods, the present method provides an endless belt construction exhibiting superior wear properties and lubricity as well as reduced heat generation characteristics and improved dimensional stability. Methods for providing the belt construction of the invention and fbr coating a porous fabric material with a high ethylene-containing elastomer are also contemplated and described.

The endless, positive drive power transmission belt of the invention may have a drive surface exhibiting any conventional spatial surface configuration corresponding to the spatial surface configuration of the cooperating pulley.

In one embodiment of the invention, a woven or non-woven fabric is provided as the inner drive surface of the endless belt wherein the drive surface of the belt is defined by a plurality of longitudinally alternating projections and valleys (or land portions) extending along the longitudinal axis of the endless belt.

In another embodiment of the invention, the drive surface may comprise a plurality of laterally alternating rib members extending longitudinally on the belt surface.

A method is also provided for coating a wear resistant fabric material useful in the manufacture of an endless, positive drive power transmission belt, wherein a specialized high ethylene-containing elastomer or plastomer is coated onto a woven, non-woven or knitted fabric material by a suitable coating method such as calendering to form a drive surface or backing surface for an endless belt. By taking advantage of current state of the art of high ethylene-containing elastomer chemistry and appropriate coating methods, the drive surface, or in some instances the backing surface, of the inventive belt exhibits superior wear properties and lubricity as well as reduced heat generation characteristics and improved dimensional stability.

DETAILED DESCRIPTION OF THE INVENTION

The present invention pertains to the use of a specialized high ethylene-containing elastomer as a surface layer on the tooth-like projections extending from the inner surface of an endless belt, wherein the high ethylene-containing tooth-like projections exhibit superior wear and lubricity properties as well as reduced heat generation and improved dimensional stability when the endless belt mates with corresponding grooves in a pulley to create a driving force in the operation of various machinery such as an automobile engine.

Figure 1:
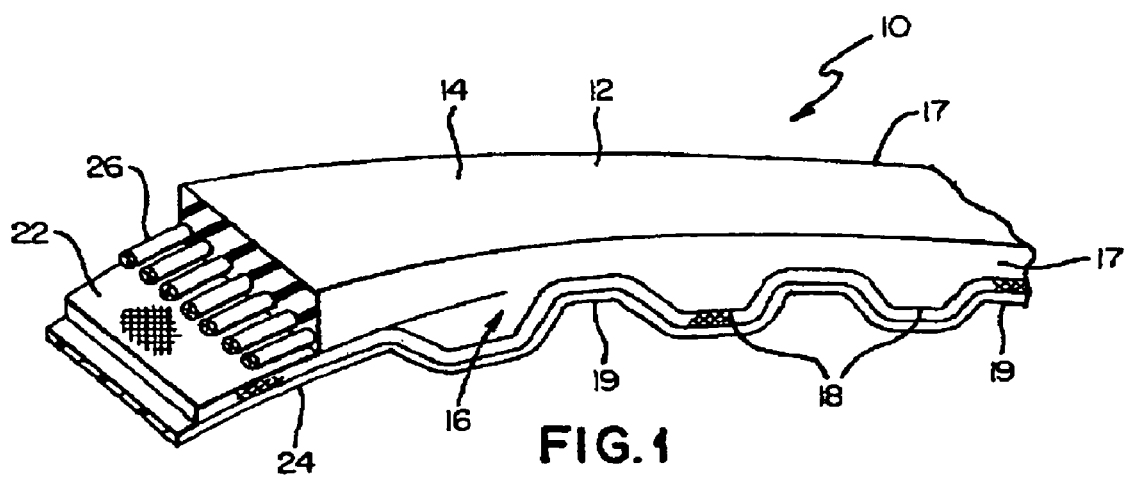
FIG. 1 is a fragmentary, perspective view of one embodiment of a power transmission belt of the present invention.
Figure 2:
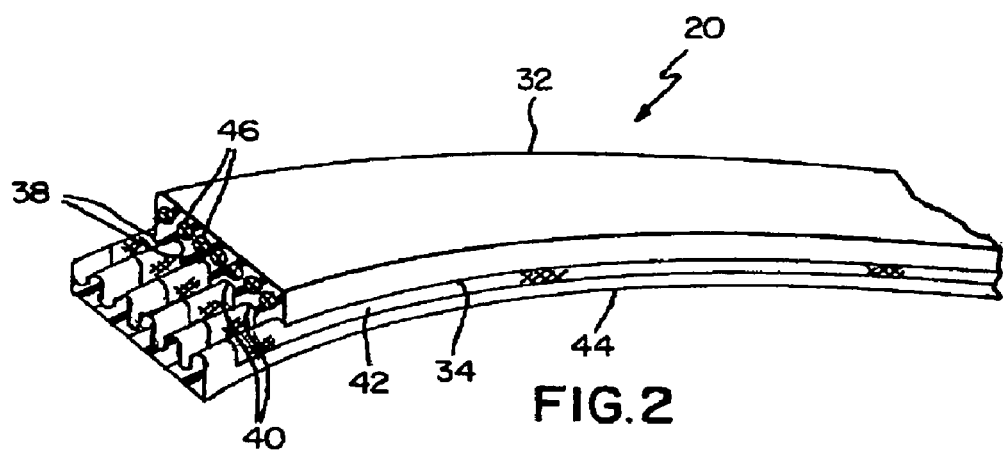
FIG. 2 is fragmentary, perspective view of another embodiment of a power transmission belt of the present invention.

In accordance with the invention, an endless belt 10 having a body portion 12, an outer longitudinal surface 14, an inner longitudinal surface 16 and a pair of opposed side surfaces 17, is generally shown in FIGS. 1 and 2. A first embodiment of the power transmission belt of the invention is illustrated in FIG. 1, where the inner longitudinal surface 16 of the endless belt 10 includes a plurality of projections 18 integrally and equidistantly formed on the inner longitudinal surface 16. The plurality of projections 18 extend perpendicularly from the inner surface 16, leaving a plurality of land portions 19 interposed at an equidistance between the plurality of projections 18. The body portion 12 of the endless belt 10 is formed from a suitable polymeric material, such as natural rubbers, synthetic rubbers, urethanes such as the liquid cast or millable gum variety, polyesters, and the like, and blends thereof, which has on the surface thereof, a reinforcing fabric material 22 which forms a face cover therefor. The reinforcing fabric material 22 carries a high ethylene-containing elastoiner layer 24 positioned and bonded to the reinforcing fabric material 22 along the outer pulley-engaging projections 18 and land portions 19 of die endless belt 10. The high ethylene-containing elastomer layer 24 is not only highly effective in providing the endless belt 10 with superior wear properties, but the specialized high ethylene-containing layer 24 also exhibits excellent lubricity characteristics and improved dimensional stability as well as reduced heat generation characteristics. The body portion 12 of the endless belt 10 may also comprise a plurality of longitudinally extending load carrying cords 26 embedded therein or embedded in a backing layer 26 to provide strength to the endless belt 10.

FIG. 2 illustrates another embodiment of the power transmission belt, where the inner longitudinal surface 34 of the endless belt 20 includes a plurality of projections 38 integrally and equidistantly formed on the inner longitudinal surface 34. The plurality of projections 38 extend perpendicularly from the inner surface 34, leaving a plurality of land portions 40 interposed at an equidistance between the plurality of projections 38. The body portion 32 of the endless belt 20 is formed from a suitable polymeric material, such as natural rubbers, synthetic rubbers, urethanes such as the liquid cast or millable gum variety, polyesters, and the like, and blends thereof, which has on the surface thereof, a reinforcing fabric material 42 which forms a face cover therefor. The reinforcing fabric material 42 carries a high ethylene-containing elastomer layer 44 positioned and bonded to the reinforcing fabric material 42 along the outer pulley-engaging projections 38 and land portions 40 of the endless belt 20. The high ethylene-containing elastomer layer 44 is not only highly effective in providing the endless belt 20 with superior wear properties, but the specialized high ethylene-containing layer 44 also exhibits excellent lubricity characteristics and improved dimensional stability as well as reduced heat generation characteristics. The body portion 32 of the endless belt 20 may also comprise a plurality of longitudinally extending load carrying cords 44 embedded therein or embedded in a backing layer (not shown) to provide strength to the endless belt 20.

The high ethylene-containing elastomer of the present invention, when applied to a fabric facing on a sprocket-engaging surface of an endless belt, provides superior dimensional stability and reduced heat generation compared to currently used elastomer coated fabrics. In addition, the high ethylene-containing elastomer exhibits excellent lubricity characteristics.

The specialized high ethylene-containing material may be any of the high ethylene-containing olefinic elastomers, such as ethylene-propylene (EP), ethylene-propylene-diene monomer (EPDM), ethylene-butene, ethylene-pentene, ethylene-hexene, ethylene-heptene, ethylene-octene, and the like, where the ethylene content of the high ethylene-containing elastomer or plastomer is greater than about 50% by weight based on the weight of the elastomer, preferably, the ethylene content is about 70 to 95%, and most preferably the ethylene content is about 70 to 93%. Ethylene-EPDM elastomers containing 75 to 93% by weight ethylene, and ethylene-octene elastomers containing 92% by weight ethylene have been found to be especially effective for use in the present invention.

The high ethylene-containing elastomers of the invention may also contain other additives such as plasticizers, vulcanizing agents, accelerators, co-agents, reinforcing agents, antioxidants, etc. which, when blended with the elastomer, form a composition that is processible by current practice processes to produce a fabric coating for tooth facing that has superior wear properties as well as having other desirable properties that heretofore have not been obtainable in tooth fabric coatings. Certain additives may provide more than one beneficial effect. Also, certain additives, when combined with certain other additives, afford desirable benefits which are greater than the benefit obtained by using a comparable amount of either of the individual additives alone. Such additives typically include one or more forms of carbon, e.g., carbon black such as conductive carbon black and/or graphite, in an amount of 0 to about 90 phr, preferably about 5 to 80 phr, or mixtures of graphite and conductive carbon black containing about 50 to 70 phr graphite and about 10 to 30 phr conductive carbon; silica, in an amount of 0 to about 50 phr, preferably 0 to about 15 phr; a plasticizer such as naphthenic or paraffinic oil, in an amount of 0 to about 50 phr, preferably about 1 to 10 phr; an organic peroxide such as di-t-butyl peroxide, benzoyl peroxide, dicumyl peroxide, 2,5-dimethyl-2,5-di(t-butylperoxy)hexane, 2,5-dicumyl-2,5-di)t-butylperoxy)hexyne-3, 1,1 bis(t-butylperoxyne-3; t-butylperoxybenzoate, and the like in an amount of 0 to about 8 phr, preferably 0 to about 5 phr; a co-agent such as N,N',m-phenylenedimaleimide, trimallitate, triallyl cyanurate, diallylphthalate, metal acrylate, e.g., zinc diacrylate and/or other metal acrylates in an amount of 0 to about 20 phr, preferably 0 to about 5 phr; sulfur in an amount of 0 to about 5 phr; and an accelerator such as 4,4-di-thiodimorpholine, thiuram, e.g., tetramethylthiuram disulfide, dipentamethylenethiuram hexasulfide, sulfonamide, zinc dibubutyidithiocarbamate, 2-mercaptobenzothiazol, dibenzothiozyl disulfide, or a mixture thereof, in an amount of 0 to about 15 phr, preferably 0 to about 10 phr. The amounts indicated for the above ingredients are based upon 100 phr elastomer. Other ingredients such as antioxidants, zinc oxide, etc. may be included in a sufficient amount to provide their desired effect.

The fabric facing material 22 of the endless belt 10 of the present invention is attached to and covers the inside surface of the projections 18 and land portions 20 to form an intimate surface thereon which contacts and cooperates with a pulley (not shown). The fabric facing material 22 may consist of a woven or non-woven layer. In one aspect of the invention, the fabric facing material 22 is a woven cloth or canvas material and may be of any desired configuration such as conventional weave consisting of warp and weft threads at any desired angle, or it may consist of warp threads held together by spaced pick cords of a knitted or braided configuration. If desired, the fabric facing material 22 may be applied to the endless belt 10 on a bias so that the strands form an angle with the direction of travel of the endless belt 10. The fabric used to form the woven fabric facing material 22 may be any conventional natural or synthetic fibers such as cotton, polyester, polyamide, hemp, jute, fiber glass, and the like, or a combination thereof.

The high ethylene-containing elastomer may be applied to the fabric facing material using conventional processes such as calendering, wherein the high ethylene-containing elastomer is applied directly onto the wear resistant fabric material or the high ethylene-containing elastomer may be calendered as an unsupported film which is subsequently laminated to the wear resistant fabric material. Other conventional methods such as knife coating or solution dip coating, in some instances, may also be employed to the extent that the high ethylene-containing elastomer is soluble in an appropriate cement/spread solvent. A detailed discussion of the various methods for applying resinous coating substances to textile substrates can be found in *Wellington Sears Handbook of Industrial Textiles,* (1963) Ernest R. Kaswell, Wellington Sears Company, Inc., 111 West 40$^{th}$ Street, New York 18, N.Y., a sales subsidiary of West Point Manufacturing Company, Inc., West Point, Ga.

In one aspect of the invention, the formulations useful in carrying out the present invention are applied directly to a wear resistant fabric material for use as a pulley-engaging wear resistant surface on an endless toothed belt by calendering. In another aspect of the invention, the high ethylene-containing elastomeric compound is calendered to form an unsupported film which is then laminated, in a conventional manner, to the wear-resistant fabric material. Typical formulations are exemplified by formulas A and B below:

| | Parts per Hundred (phr) |
|---|---|
| Formulation A | |
| EPDM (93% Ethylene) | 100.0 |
| Graphite | 20.0 |
| Paraffinic Oil | 5.0 |
| Dicumyl Peroxide | 4.0 |
| N,N'-m-Phenylene Diamleimide | 1.5 |
| Triallyl Cyanurate | 2.0 |
| Formulation B | |
| Ethylene-Octene Elastomer (92% Ethylene) | 100.0 |
| Carbon Black | 10.0 |
| Silica | 10.0 |

-continued

| | Parts per Hundred (phr) |
|---|---|
| Paraffinic Oil | 5.0 |
| Dicumyl Peroxide | 4.0 |
| N,N'-m-Phenylene Dimaleimide | 1.5 |
| Triallyl Cyanurate | 2.0 |

In the following examples, DIN abrasion and frictional testing were performed on the compounds. The DIN test is performed by moving a button of the cured compound across a rotating sandpaper drum, and the friction test involves pulling a weighted slab of the compound across a steel surface. The formulations of Examples 2 and 3 are presented for the purpose illustrating the present formulations and exemplifying the advantages of the present formulations over conventional formulations. It is to be understood that such formulations are for illustrative purposes only and that such formulations are, by no means, intended to limit the formulations of the invention.

COMPARATIVE EXAMPLE 1

A conventional button of conventional formulation was subjected to standard DIN Abrasion Test conditions. Results of the DIN abrasion test showed that the conventional formulation exhibited a 226 mg. loss and an average moving frictional force of 1 lb. as determined by the friction test.

EXAMPLE 2

A high ethylene-containing EPDM elastomeric composition was formulated as indicated below:

| | |
|---|---|
| EPDM (75% Ethylene) | 100.0 phr |
| Graphite (Carbon) | 60.0 phr |
| Conductive Carbon Black | 14.0 phr |
| Paraffinic Oil | 5.0 phr |
| Dicumyl Peroxide | 3.6 phr |
| Triallyl Cyanurate | 2.0 phr |
| N,N'-m-Phenylene Dimaleimide | 1.5 phr |
| Benzothiazyl Disulfide | 1.0 phr |
| Zinc Oxide and Antioxidants | Minor Amounts |

The formulation was subjected to standard DIN abrasion test conditions. Results of the DIN abrasion test showed that the belt surface containing the formulation of Example 2 exhibited a 116 mg. loss and an average moving frictional force of 0.134 lbs as determined by the friction test.

EXAMPLE 3

A high ethylene-containing EPDM elastomeric composition was formulated as indicated below:

| | |
|---|---|
| EPDM (75% Ethylene) | 100.0 phr |
| Graphite (Carbon) | 60.0 phr |
| Conductive Carbon Black | 14.0 phr |
| Paraffinic Oil | 5.0 phr |
| Benzothiazyl Disulfide | 1.0 phr |
| Tetramethylthiuram Disulfide | 0.6 phr |
| Zinc Dibutyldithiocarbamate | 2.0 phr |
| Dipentamethylenethiuram Hexasulfide | 1.5 phr |

-continued

| | |
|---|---|
| 4,4-dithiodimorpholine | 2.0 phr |
| Zinc Oxide and Antioxidants | Minor Amounts |

The formulation was subjected to standard DIN abrasion test conditions. Results of the DIN abrasion test showed that the belt surface containing the formulation of Example 3 exhibited a 105 mg. loss and an average moving frictional force of 0.199 lbs. as determined by the friction test.

As shown by the above examples, the high ethylene-containing elastomer formulations of Examples 2 and 3 exhibited superior dimensional stability as demonstrated by the diminished loss of surface area, as well as a diminished moving frictional force as determined by the friction test. For example, the loss of surface area of the high ethylene-containing elastomer formulations of the present invention (Examples 2 and 3) are 50% less than the loss of surface area on a conventional wear-resistant formulation (Comparative Example 1). Furthermore, the high ethylene-containing elastomer formulation of the present invention (Examples 2 and 3) have an average moving frictional force which is less than 20% of that of conventional formulations (Comparative Example 1).

The foregoing detailed description and examples are provided for the purpose of illustration only and are not intended to define limitations of the scope of the appended claims.

What is claimed is:

1. In an endless, positive drive power transmission belt having a peripheral pulley-engaging surface for use with a cooperating pulley wherein the endless positive drive transmission belt comprises: an elastomeric body portion having an outer longitudinal surface, an inner peripheral pulley-engaging longitudinal surface, a pair of laterally facing side surfaces extending therebetween, a plurality of spaced apart tensile members disposed in said elastomeric body portion, and a wear-resistant fabric material disnosed on said inner peripheral pulley-engaging longitudinal surface; the improvement comprising a layer of a high ethylene-containing elastomer composition comprising a high ethylene-containing elastomer having at least 50% by weight ethylene bonded to said inner peripheral pulley-engaging surface of said wear-resistant fabric material, wherein said high ethylene-containing elastomer is selected from the group consisting of EPDM, ethylene-propylene, ethylene-butene, ethylene-pentene, ethylene-hexene, ethylene-heptene and ethylene-octene, wherein said high ethylene-containing elastomer composition comprises about 100 phr of said high ethylene-olefinic elastomer; 0 to about 90 phr carbon in the form of conductive carbon black and/or graphite; 0 to about 50 pbr silica; 0 to about 50 phr of a plasticizer selected from the group consisting of naphtbenic oil and parafilnic oil; 0 to about 8 phr of an organic peroxide selected from the group consisting of di-t-butyl peroxide, beuzoyl peroxide, dicumyl peroxide, 2,5-dimethyl-2,5-di(t-butylperoxy) hexane, 2,5-dicumyl-2,5-di)t-butylperoxy)hexyne-3, 1,1bis(t-butylperoxyne-3 and t-butylperoxybenzoate; 0 to 20 phr of a co-agent selected from the group consisting of N,N'-m-phenylene dimaleimide, triallyl trimallitate, triallyl cyanurate, dialylphthalate, metal acrylate, metal diacrylate and mixtures thereof; 0 to about 5 phr sulfur; and 0 to about 5 phr of an accelerator selected from the group consisting of thiuram, sulfonamide, dithiocarbamate, 2-mercaptobenzothiazol, dibenzotbiazyl disultide, or a mixture thereof.

2. The power transmission belt of claim 1 wherein said high ethylene-containing elastomer composition bonded to said wear-resistant fabric material, exhibits a spatial surface configuration conforming to a corresponding spatial surface configuration exhibited by said inner peripheral pulley-engaging longitudinal surface.

3. The power transmission belt of claim 2 wherein said corresponding spatial surface configuration exhibited by said inner peripheral pulley-engaging longitudinal surface comprises a plurality of alternating longitudinally spaced projections and land portions defining the inner peripheral pulley-engaging longitudinal surface of said power transmission belt, and the layer of high ethylene-containing elastomer composition is bonded to said wear-resistant fabric material on said plurality of alternating projections and land portions forming said peripheral pulley-engaging longitudinal surface.

4. The power transmission belt of claim 2 wherein said corresponding spatial configuration exhibited by said inner peripheral pulley-engaging longitudinal surface comprises a plurality of alternating laterally spaced rib members defining the inner peripheral pulley engaging longitudinal surface of said power transmission belt, and the layer of high ethylene-containing elastonier composition is bonded to said wear resistant fabric material on said plurality of alternating laterally spaced rib members forming said peripheral pulley-engaging longitudinal surface.

5. The power transmission belt of claim 1 wherein said high ethylene-containing olefinic elastomer contains about 70 to 95% by weight ethylene.

6. The power transmission belt of claim 1 wherein said high ethylene-containing elastomer is an EPDM elastomer or an ethylene-octene elastomer.

7. The power transmission belt of claim 1 wherein said high ethylene-containing elastomer composition comprises: about 100 pbr of a high ethylene-containing elastomer selected from the group consisting of ethylene-EPDM elastomer and ethylene-octene elastomers having an ethylene content of about 70 to 95% by weight of said ethylene-EPDM elastomer or said ethylene-octene elastomer; about 5 to 90 phr carbon, graphite or mixtures thereof; 0 to about 15 phr silica; about 1 to 10 phr of a plasticizer selected from the group consisting of naphthenic oil and paraffinic oil; 0 to about 8 phr of an organic peroxide curing agent selected from the group consisting of di-t-butyl peroxide, benzoyl peroxide, dicumyl peroxide, 2,5-dimethyl-2,5-di(t-butylperoxy) hexane, 2,5-dicumyl-2,5-di(t-butylperoxy)hcxyne-3, 1,1 bis(t-butylperoxyne-3, t-butylperoxybenzoate, and mixtures thereof; about 1 to 8 phr of an accelerator selected from the group consisting of 4,4-dithiodimorpholine a thiuram, a sulfonamide, zinc dibutyl dithiocarbamate, 2-mercaptobenzothiazol, dibenzotbiozyl disulfide and mixtures thereof; 0 to about 5 phr of a co-agent selected from the group consisting of N,N'-m-phenylene dimaleintide, triallyl trimallitate, triallyl cyanurate, diallylphthalate; metal acrylate, metal diacrylate and mixtures thereof; and 0 to about 5 phr sulfur.

8. The power transmission belt of claim 7 wherein said carbon is in the form of a mixture of conductive carbon black and graphite.

9. The power transmission belt of claim 7 wherein said plasticizer is paraffinic oil.

10. The power transmission belt of claim 7 wherein said organic peroxide is dicumyl peroxide.

11. An endless, positive drive power transmission belt for use with a cooperating pulley member having a plurality of alternating projections and land portions thereon, wherein the endless positive drive transmission belt comprises: an elastomeric body portion; a plurality of longitudinally extending spaced apart tensile members; a plurality of alternating engaging projections and land portions on said belt defining the inner periphery surface of said elastomeric body portion on said belt, wherein said plurality of alternating engaging projections and land portions on said belt correspond to a plurality of corresponding alternating engaging projections and land portions on a cooperating pulley member; a layer of wear-resistant fabric material positioned on the cooperating pulley member engaging surface of the plurality of engaging alternating projections and land portions on said belt; and a surface layer of a high ethylene-containing elastomer composition, said high ethylene-containing elastomer composition comprising an EPDM elastomer having an ethylene content of about 70 to 95% by weight of said EPDM elastomer; about 10 to 90 phr carbon; about 0 to 20 pbr silica; about 1 to 10 phr paraffinic oil; about 0 to 8 phr of an organic peroxide curing agent selected from the group consisting of di-t-butyl peroxide, benzoyl peroxide, dicumyl peroxide, 2,5-dimethyl-2,5-di(t-butylperoxy) hexane, 2,5-dicumyl-2,5-di(t-butylperoxy)bexyne-3, 1,1 bis(t-butylpcroxyne-3, t-butylperoxybenzoate, and mixtures thereof; about 0 to 5 phr of a co-agent selected from the group consisting of N, N'-m-phenylene dimaleimide, triallyl cyanurate, triallyl trimallitate, diallylphthalate, metal acrylates, metal diacrylates, and mixtures thereof; and 0 to about 8 phr of an accelerator selected from the group consisting of benzothiazyl disulfide, tetramethylthiuram disulfide, zinc dibutyldithiocarbamate, dipentamethylenetbiuram hexasulfide, 4,4-di thiodirorpholine, and mixtures thereof, wherein said ethylene-EPDM elastomer is bonded to a surface of said layer of wear-resistant fabric material, such that said surface layer of high ethylene-containing elastomer composition is disposed between said layer of wear-resistant fabric material and said plurality of alternating engaging projections and land portions on said cooperating pulley member such that said surface layer of high ethylene-containing elastomer comnosition conforms to the surface of the wear-resistant fabric material.

12. The power transmission belt of claim 11 wherein said carbon is in the form of carbon black or graphite.

13. The power transmission belt of claim 11 wherein said organic peroxide is dicumyl peroxide.

14. In a method for manufacturing an endless, positive drive power transmission belt having a pulley-engaginig surface for use with a cooperating pulley member, wherein the endless, positive drive transmission belt comprises an elastomer body nortion, a plurality of longitudinal extending spaced apart tensile members therein, and a layer of wear-resistant fabric material forming said pulley-engaging surface of said power transmission belt; the improvement comprising the step of applying a layer of a high ethylene-containing elastomer comnosition containing a high ethylene-containing elastomer having at least 50% by weight ethylene onto the surface of said wear-resistant fabric material such that said layer of high ethylene-containing elastomer composition conforms to the pulley-engaging surface of said power transmission belt, wherein said high ethylene-containing elastomer is selected from the groun consisting of EPDM, ethylene-propylene, ethylene-butene, ethylene-pentene, ethylene-hexene, ethylene-heptene and ethylene-octene, wherein said high ethylene-containing elastomer compositon comprises about 100 phr of said high ethylene-containing elastomer, 0 to about 90 phr carbon in the form of conductive carbon black and/or graphite; 0 to about 50 phr silica; 0 to about 50 phr of a plasticizer selected from the group consisting of naphthenic oil and paraffinic oil; 0 to about 8 phr of an organic peroxide selected from the group consisting of di-t-butyl peroxide, benzoyl peroxide, dicumyl peroxide, 2,5-dimethyl-2,5-di(t-butylperoxy) hexane, 2,5-dicumyl-2,5-di)t-butylperoxy)hexyne-3, 1,1 bis(t-butylperoxyne-3 and t-butylperoxybenzoate; 0 to 20 phr of a co-agent selected from the group consisting of N, N'-m-phenylene dimaleimide, triallyl trimallitate, triallyl cyanurate, diallyiphthalate, metal acrylate, metal diacrylate and mixtures thereof; 0 to about 5 phr sulfur; and 0 to about 5 phr of an accelerator selected from the group consisting of thiuram, sulfonamide, ditbiocarbamate, 2-mercaptobenzothiazol, dibenzothiazyl disulfide, or a mixture thereof.

15. The method of claim 16 wherein said high ethylene-containing elastomer contains about 70 to 95% by weight ethylene, and said high ethylene-containing elastomer composition comprises about 100 phr of said high ethylene-containing elastomer, about 10 to 90 phr carbon in the form of carbon black or graphite; 0 to about 15 phr silica; about 1 to 10 phr paraffinic oil; about 0 to about 10 phr dicumyl peroxide; and about 0 to 5 phr of a co-agent selected from the group consisting of N,N'-m-phenylene dimaleimide, triallyl cyanurate, triallyl trimallitate, diallylphthalate, metal acrylate, metal diacrylate, and mixtures thereof; and 0 to about 10 phr of an accelerator selected from the group consisting of thiuram, sulfonamide, dithiocarbamate, 2-mercaptobenzothiazol, dibenzothiazyl, disuifide, and mixtures thereof.

16. The method of claim 14 wherein said high ethylene-containing elastomer composition bonded to said wear-resistant fabric material, exhibits a spatial surface configuration conforming to a corresponding spatial surface configuration exhibited by said inner peripheral pulley-engaging longitudinal surface.

17. The method of claim 16 wherein said corresponding spatial surface configuration exhibited by said inner peripheral pulley-engaging longitudinal surface comprises a plurality of alternating longitudinally spaced projections and land portions defining the inner peripheral pulley-engaging longitudinal surface of said power transmission belt and the layer of high ethylene-containing elastomer composition is bonded to said wear-resistant fabric material on said plurality of alternating projections and land portions forming said peripheral pulley-engaging longitudinal surface.

18. The power transmission belt of claim 14 wherein said corresponding spatial configuration exhibited by said inner peripheral pulley-engaging longitudinal surface comprises a plurality of alternating laterally spaced rib members defining the inner peripheral pulley engaging longitudinal surface of said power transmission belt, and the layer of high ethylene-containing elastomer composition is bonded to said wear-resistant fabric material on said plurality of alternating laterally spaced rib members forming said peripheral pulley engaging longitudinal surface.

19. The method of claim 14 wherein said high ethylene-containing elastomer composition is applied to said fabric material by calendering.

20. The method of claim 19 wherein said high ethylene-containing elastomer composition is calendered directly onto the inner pulley-engaging surface of said fabric material.

21. The method of claim 19 wherein said high ethylene-containing elastomer composition is calendered to form an unsupported film comprising said high ethylene-containing elastomer composition and subsequently laminating said unsupported film to the inner pulley-engaging surface of said fabric material in a separate operation.

* * * * *